United States Patent
Morisaki

(10) Patent No.: US 10,884,389 B2
(45) Date of Patent: Jan. 5, 2021

(54) SERVER AND SYSTEM CONNECTED TO A MACHINE TO PERFORM CUTTING MACHINING VIA A NETWORK

(71) Applicant: FANUC CORPORATION, Yamanashi (JP)

(72) Inventor: Kazuhiko Morisaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 18 days.

(21) Appl. No.: 16/151,587

(22) Filed: Oct. 4, 2018

(65) Prior Publication Data
US 2019/0113901 A1     Apr. 18, 2019

(30) Foreign Application Priority Data
Oct. 16, 2017   (JP) .................................. 2017-200505

(51) Int. Cl.
*G05B 19/042* (2006.01)
*G06F 3/0482* (2013.01)
(Continued)

(52) U.S. Cl.
CPC ..... *G05B 19/0426* (2013.01); *G05B 19/0405* (2013.01); *G06F 3/0482* (2013.01); *G06F 16/9038* (2019.01); *G06F 16/90335* (2019.01)

(58) Field of Classification Search
CPC ............ G05B 19/0426; G05B 19/0405; G06F 16/90335; G06F 16/9038; G06F 3/0482; G06Q 10/06; G06Q 10/10; Y02P 90/30
(Continued)

(56) References Cited

U.S. PATENT DOCUMENTS 5,231,585 A  *  7/1993  Kobayashi ....... G05B 19/41865
                                                         700/96
2005/0246040 A1* 11/2005 Horkavi ............. G05B 19/0426
                                                         700/83
(Continued)

FOREIGN PATENT DOCUMENTS

CN          106446478        2/2017
EP          1296211 A1   *   3/2003   ........... G05B 19/418
(Continued)

OTHER PUBLICATIONS

Notification of Reasons for Refusal dated Aug. 20, 2019 in Japanese Patent Application No. 2017-200505.
(Continued)

*Primary Examiner* — Rocio Del Mar Perez-Velez
*Assistant Examiner* — Alicia M. Choi
(74) *Attorney, Agent, or Firm* — Wenderoth, Lind & Ponack, L.L.P.

(57) ABSTRACT

A server is connected to machines that perform cutting machining via a network. A common database shared by the machines is stored in the server, the database includes machining result information used in steps included in a cutting machining process performed by the machine and information on a use frequency of the machining result information. A machining result information presentation request to present machining result information that satisfies cutting conditions input by an operator of the machine is received from the machine. When the machining result information presentation request is received, the machining result information that satisfies the cutting conditions is extracted from the database and is presented to the machine based on the use frequency of the machining result information. A machining program is created based on machining result information selected by the operator among pieces of
(Continued)

machining result information from the machine and is presented to the machine.

10 Claims, 14 Drawing Sheets

(51) Int. Cl.
    *G06F 16/9038* (2019.01)
    *G06F 16/903* (2019.01)
    *G05B 19/04* (2006.01)

(58) Field of Classification Search
    USPC .......................................................... 700/86
    See application file for complete search history.

(56) References Cited

U.S. PATENT DOCUMENTS

2016/0346950 A1* 12/2016 Thielen ................ B26D 7/2635
2017/0285614 A1* 10/2017 Kawai .................. G05B 19/409
2018/0157241 A1* 6/2018 Chen .................. G05B 19/4155

FOREIGN PATENT DOCUMENTS

| JP | 2001-5507 | 1/2001 |
| JP | 2016-186686 | 10/2016 |
| JP | 2016/206742 | 12/2016 |
| WO | 02/03156 | 1/2002 |
| WO | 2016/051545 | 4/2016 |

OTHER PUBLICATIONS

Office Action dated May 19, 2020 in CN Patent Application No. 201811183909.X.

* cited by examiner

FIG. 4

SETTING STEP LIST SCREEN

STEP INSTRUCTION

FIRST SPINDLE
TOOL POST

| No. | MACHINING TYPE/ MACHINING SHAPE NAME | T CODE | TOOL DIMENSIONS | MACHINING START POSITION | MACHINING SURFACE | CONTROL AXIS |
|---|---|---|---|---|---|---|
| 01 | HOLE MACHINING (DRILLING) | | | | | |
| | [ REGION-01 ] | T00001001 | D 28.000 | DX 1000.000 Z 300.000 | TURNING SURFACE | — |
| 02 | ROUGHING (OUTER DIAMETER) | | | | | |
| | [ REGION-01 ] | T00002002 | R 0.800 | DX 1000.000 Z 300.000 | TURNING SURFACE | — |
| | [ REGION-02 ] | T00002002 | R 0.800 | DX 1000.000 Z 300.000 | TURNING SURFACE | — |
| 03 | ROUGHING (INNER DIAMETER) | | | | | |
| | [ REGION-01 ] | T00003003 | R 0.800 | DX 1000.000 Z 300.000 | TURNING SURFACE | — |
| 04 | FINISHING (OUTER DIAMETER) | | | | | |

EDIT
[ADD(A)] [CHANGE(M)] [MOVE(V)] [DELETE(D)] [ASSIST(X)]

AUTO
[DETERMINE STEP(A)] [CHANGE ORDER(M)]

[END(C)]

PLEASE SELECT MACHINING STEP OR MACHINING DATA

STEP DETAILS SETTING SCREEEN 52

| SET SETTING VALUE | | |
|---|---|---|
| CUTTING CONDITION(C) | TOOL DATA (I) | MACHINING START POSITION/ PASSING POINT(P) |

CUTTING METHOD(U)
- ● CHOPPING

CLEARANCE AMOUNT(L)
- Z-AXIS DIRECTION: 3 [?]
- X-AXIS DIRECTION: 3

OPTION(O)
- ☑ MACHINE POCKET PART
- ☐ MACHINE OVERHANG PART

OK
CANCEL
REGISTER TO LIBRARY(S)
NEXT PAGE(N)
PREVIOUS PAGE(V)

FINISHING ALLOWANCE(E)
- Z-AXIS DIRECTION: 0.2 [?]
- X-AXIS DIRECTION: 0.2

DEPTH OF CUT(D)
- DEPTH OF CUT PER EACH TIME: 300
- CHANGE IN DEPTH OF CUT: 0.25
- CLAMPING VALUE OF DEPTH OF CUT: 0.2
- FIRST OVERRIDE(%): 0.25

RETURN AND ESCAPE AMOUNT(M)
- Z-AXIS DIRECTION: 3 [?]
- X-AXIS DIRECTION: 3

COOLING METHOD(A)
- ○ DO NOT COOL
- ● CUTTING LIQUID1
- ○ CUTTING LIQUID2

FIG. 6

TOOL INFORMATION SETTING SCREEN 53

SET SETTING VALUE

| CUTTING CONDITION(C) | TOOL DATA(I) | MACHINING START POSITION/ PASSING POINT(P) |

TOOL NAME: GENERAL-PURPOSE (OUTER DIAMETER END SURFACE ROUGHING) 1
TOOL KIND: GENERAL-PURPOSE TOOL
TOOL TYPE: TURNING TOOL
MATERIAL NAME: Carbide

OK
CANCEL
REGISTER TO LIBRARY(S)
NEXT PAGE(N)
PREVIOUS PAGE(V)

TOOL DIMENSIONS (D)
TOOL NOSE RADIUS: 0.8    TOOL WIDTH: 30
CUTTING EDGE ANGLE: 95
TOOL NOSE ANGLE: 80    CUTTING EDGE PROTECTION ANGLE: 3

TOOL INFORMATION
MACHINING PURPOSE1: ROUGHING
MACHINING PURPOSE2: OUTER DIAMETER, END SURFACE
SPINDLE ROTATION DIRECTION: NORMAL ROTATION

ATTACHMENT INFORMATION
ATTACHMENT POSITION INFORMATION: LEFT
ATTACHMENT POSITION(Z-AXISX): 0
ATTACHMENT ATTACHMENT ANGLE(X-AXIS): 0
ATTACHMENT ANGLE: −90

FIG. 7

CUTTING SPEED SETTING SCREEN 54

| SET MACHINING CONDITION | | |
|---|---|---|
| CUTTING CONDITION(C) | TOOL DATA (I) | MACHINING START POSITION/ PASSING POINT(P) |

CUTTING SPEED/ FEED RATE (U)
- CUTTING SPEED:
- FEED RATE (CUTTING DIRECTION):
- FEED RATE (DEPTH-OF-CUT DIRECTION):
- FEED RATE (CUT-UP DIRECTION):
- SPINDLE MAXIMUM SPEED:

HINT !

OK
CANCEL
REGISTER TO LIBRARY(S)
NEXT PAGE(N)
PREVIOUS PAGE(V)

FIG. 8

HINT SCREEN                                                           55

| HINT FOR SETTING VALUE-WORK MATERIAL :AL- ROUGHING(OUTER DIAMETER) |
|---|
| HINTS FOR SETTING VALUES ARE RETRIEVED. PLEASE SELECT POINT TO BE EMPHASIZED. |

| | | | |
|---|---|---|---|
| MACHINING TIME: | EMPHASIZE | DO NOT | SEARCH |
| MACHINING ACCURACY: | EMPHASIZE | DO NOT | CANCEL |
| MACHINING QUALITY: | EMPHASIZE | DO NOT | |
| TOOL LIFE-SPAN : | EMPHASIZE | DO NOT | |
| TOOL PRICE: | EMPHASIZE | DO NOT | |

FIG. 9

RETRIEVAL RESULT SCREEN                                               56

| RETRIEVAL RESULT-WORK MATERIAL :AL- ROUGHING(OUTER DIAMETER) | | | | | | |
|---|---|---|---|---|---|---|
| CUTTING SPEED: | 300 | 300 | 290 | 290 | 300 | APPLY TO MACHINING STEP |
| FEED RATE(CUTTING DIRECTION): | 0.28 | 0.25 | 0.25 | 0.15 | 0.25 | |
| FEED RATE(DEPTH-OF-CUT DIRECTION): | 0.2 | 0.2 | 0.2 | 0.2 | 0.22 | NEXT FIVE RESULTS>> |
| FEED RATE(CUT-UP DIRECTION): | 0.25 | 0.25 | 0.25 | 0.2 | 0.25 | |
| SPINDLE MAXIMUM SPEED: | 5100 | 5000 | 4850 | 5000 | 5100 | <<PREVIOUS FIVE RESULTS |

FIG. 10

CUTTING SPEED SETTING SCREEN 54

| SETTING VALUE | | |
|---|---|---|
| CUTTING CONDITION(C) | TOOL DATA (I) | MACHINING START POSITION/ PASSING POINT(P) |

CUTTING SPEED/ FEED RATE (U)
- CUTTING SPEED: 300
- FEED RATE (CUTTING DIRECTION): 0.25
- FEED RATE (DEPTH-OF-CUT DIRECTION): 0.2
- FEED RATE (CUT-UP DIRECTION): 0.25
- SPINDLE MAXIMUM SPEED: 5000

HINT !

OK
CANCEL
REGISTER TO LIBRARY(S)
NEXT PAGE(N)
PREVIOUS PAGE(V)

FIG. 11

COMPLETED STEP LIST SCREEN

STEP INSTRUCTION

FIRST SPINDLE
TOOL POST

| No. | MACHINING TYPE / MACHINING SHAPE NAME | T CODE | TOOL DIMENSIONS | MACHINING START POSITION | MACHINING SURFACE | CONTROL AXIS |
|---|---|---|---|---|---|---|
| 01 | HOLE MACHINING (DRILLING) | | | | | |
| | [ REGION-01 ] | T00001001 | D 28.000 | DX 1000.000  Z 300.000 | TURNING SURFACE | --- |
| 02 | ROUGHING (OUTER DIAMETER) | | | | | |
| | [ REGION-01 ] | T00002002 | R 0.800 | DX 1000.000  Z 300.000 | TURNING SURFACE | --- |
| | [ REGION-02 ] | T00002002 | R 0.800 | DX 1000.000  Z 300.000 | TURNING SURFACE | --- |
| 03 | ROUGHING (INNER DIAMETER) | | | | | |
| | [ REGION-01 ] | T00003003 | R 0.800 | DX 1000.000  Z 300.000 | TURNING SURFACE | --- |
| 04 | FINISHING (OUTER DIAMETER) | | | | | |

EDIT
[ ADD(A) ] [ CHANGE(M) ] [ MOVE(V) ] [ DELETE(D) ] [ ASSIST(X) ]

AUTO
[ DETERMINE STEP(A) ] [ CHANGE ORDER(M) ] [ END(C) ]

PLEASE SELECT MACHINING STEP OR MACHINING DATA

EVALUATION SCREEN 59

| EVALUATE MACHINING RESULT | | | ✕ |
|---|---|---|---|
| CUTTING CONDITION(C) | TOOL DATA (I) | MACHINING START POSITION/ PASSING POINT(P) | |

CUTTING SPEED/ FEED RATE (U)
- CUTTING SPEED: 300
- FEED RATE (CUTTING DIRECTION): 0.25
- FEED RATE (DEPTH-OF-CUT DIRECTION): 0.2
- FEED RATE (CUT-UP DIRECTION): 0.25
- SPINDLE MAXIMUM SPEED: 5000

OK
CANCEL
REGISTER TO LIBRARY(S)
NEXT PAGE(N)
PREVIOUS PAGE(V)

EVALUATE MACHINING RESULT

FIG. 13

EVALUATION INPUT SCREEN

60

EVALUATE MACHINING RESULT-WORK MATERIAL :AL-ROUGHING(OUTER DIAMETER)

| TOOL NAME: | GENERAL-PURPOSE (OUTER DIAMETER END SURFACE ROUGHING) 1 | TOOL NOSE RADIUS: | 0.8 |
|---|---|---|---|
| TOOL KIND: | GENERAL-PURPOSE TOOL | CUTTING EDGE ANGLE: | 95 |
| TOOL TYPE: | TURNING TOOL | TOOL NOSE ANGLE: | 80 |
| TOOL MATERIAL: | Carbide | TOOL WIDTH: | 30 |
| | | CUTTING EDGE PROTECTION ANGLE: | 3 |

CUTTING SPEED: 300
FEED RATE(CUTTING DIRECTION): 0.25
FEED RATE(DEPTH-OF-CUT DIRECTION): 0.2
FEED RATE(CUT-UP DIRECTION): 0.25
SPINDLE MAXIMUM SPEED: 5000

PLEASE EVAULATE MACHINING RESULT UNDER THIS CUTTING CONDITION.

| MACHINING TIME: | NOT EVALUATE | FAIL | FAIR | GOOD | EXCELLENT |
|---|---|---|---|---|---|
| MACHINING ACCURACY: | NOT EVALUATE | FAIL | FAIR | GOOD | EXCELLENT |
| MACHINING QUALITY: | NOT EVALUATE | FAIL | FAIR | GOOD | EXCELLENT |
| TOOL LIFE-SPAN: | NOT EVALUATE | FAIL | FAIR | GOOD | EXCELLENT |
| TOOL PRICE: | NOT EVALUATE | FAIL | FAIR | GOOD | EXCELLENT |

YOUR SKILL LEVEL: BEGINNER | MID-GRADE | VETERAN

SEND
CANCEL

NEXT STEP>>
<<PREVIOUS STEP

FIG. 14

EVALUATION CONFIRMATION SCREEN  61

| EVALUATION CONFIRMATION-WORK MATERIAL :AL- ROUGHING(OUTER DIAMETER) |
|---|

FOLLOWING EVALUATIONS ARE RECORDED.

MACHINING TIME: EXCELLENT
MACHINING ACCURACY: GOOD
MACHINING QUALITY: FAIR
TOOL LIFE-SPAN : GOOD
TOOL PRICE: EXCELLENT

YOUR SKILL LEVEL: MID-GRADE

OK
CANCEL
CHANGE

SERVER AND SYSTEM CONNECTED TO A MACHINE TO PERFORM CUTTING MACHINING VIA A NETWORK

This application is based on and claims the benefit of priority from Japanese Patent Application No. 2017-200505, filed on 16 Oct. 2017, the content of which is incorporated herein by reference.

BACKGROUND OF THE INVENTION

Field of the Invention

The present invention relates to a server and a system.

Related Art

Conventionally, when setting values related to cutting machining are input from a numerical controller of a machine tool or a machine in which a machine tool and a numerical controller are integrated, values satisfying desired conditions related to a work material, a cutting machining type, a tool type, and a tool material input as cutting conditions are retrieved from a setting value database for a subject machine and are displayed. When values satisfying desired conditions are not found as the retrieval results, a value input field in an input screen of the setting values related to cutting machining remains blank and an operator is requested to input values manually.

When values satisfying desired cutting conditions are not found in a setting value database for a subject machine, a value serving as a hint on a setting value related to cutting machining is not generally presented to an operator. Particularly, when the operator is a beginner, it takes a considerable time to search for setting values related to cutting machining appropriate for materials of a work and a tool.

In this regard, like an NC machining support system disclosed in Patent Document 1, for example, a conventional technique for extracting machining result information from a machining result information database of each machine collected by a server in ascending order of machining time and descending order of machining accuracy is known.

Patent Document 1: PCT International Publication No. WO02/003156

SUMMARY OF THE INVENTION

As described above, although a technique for extracting machining result information in ascending order of machining time and descending order of machining accuracy is known, it is not always true that the values of machining result information arranged in ascending order of machining time and descending order of machining accuracy bring about a satisfactory machining result. Moreover, it is not possible to present machining result information that has been judged to be generally "satisfactory" by an expert operator or machining result information which is frequently used in a field. As a result, for example, it takes a considerable time for a beginner or the like to search for setting values appropriate for materials of a work and a tool, which is not efficiently.

An object of the present invention is to provide a server and a system capable of allowing a beginner operator to easily obtain machining conditions that bring about a satisfactory machining result as compared to the conventional technique.

(1) A first server (for example, a server 10 to be described later) according to the present invention is a server connected to one or more machines (for example, machines 30 to be described later) that perform cutting machining via a network (for example, a network 20 to be described later), wherein a database (for example, a common database 16 to be described later) shared by the respective machines is stored in the server, the database including at least machining result information used in steps included in a cutting machining process performed by the machine and information on a use frequency of the machining result information, a machining result information presentation request to present machining result information that satisfies cutting conditions input by an operator of the machine is received from the machine, when the machining result information presentation request is received, the machining result information that satisfies the cutting conditions is extracted from the database and is presented to the machine on the basis of the use frequency of the machining result information, and a machining program is created on the basis of the machining result information selected by the operator among pieces of machining result information from the machine and is presented to the machine.

(2) In the server (for example, a server 10 to be described later) according to (1), the machining result information may include configuration information of the machine, a work material, a type of cutting machining in a step included in the cutting machining process, a type of a tool used in the cutting machining, a material of the tool, a tool diameter of the tool, a cutting speed in the cutting machining, and a feed rate in the cutting machining.

(3) In the server (for example, a server 10 to be described later) according to (1) or (2), the cutting conditions may include at least one of configuration information of the machine, a work material, a type of cutting machining in a step included in the cutting machining process, a type of a tool used in the cutting machining, a material of the tool, and a tool diameter of the tool.

(4) In the server (for example, a server 10 to be described later) according to any one of (1) to (3), when a machining program is created on the basis of the selected machining result information, 1 may be added to the use frequency of the selected machining result information, or when the machining result information is not selected and a machining program is created on the basis of newly set machining information, machining result information may be generated on the basis of the machining information and an initial value may be set to the information on the use frequency of the machining result information.

(5) In the server (for example, a server 10 to be described later) according to any one of (1) to (4), when the machining program is executed by the machine, evaluation information input by an operator including a skill level of the operator, an emphasizing point emphasized by the operator, and an evaluation grade on a machining result of the machining program by the operator may be stored in correlation with the machining result information included in the database.

(6) In the server (for example, a server 10 to be described later) according to any one of (1) to (5), the emphasizing point included in the evaluation information may include a machining time, machining accuracy, machining quality, a tool life-span, or a tool price.

(7) In the server (for example, a server 10 to be described later) according to (5) or (6), the machining result information presentation request may further include an emphasizing point related to machining, and when the machining result information that satisfies the cutting condition is extracted from the database, the machining result information may be presented to the machine on the basis of the emphasizing point.

(8) In the server (for example, a server 10 to be described later) according to any one of (1) to (7), when the cutting machining process includes a plurality of steps, the machining result information presentation request in the step may be received and the machining result information may be presented.

(9) A second server (for example, a server 10A to be described later) according to the present invention is a server connected to a mobile terminal (for example, a mobile terminal 40 to be described later) and one or more machines that perform cutting machining via a network, wherein a database shared by the respective machines is stored in the server, the database including at least machining result information used in steps included in a cutting machining process performed by the machine and information on a use frequency of the machining result information, a machining result information presentation request to present machining result information that satisfies cutting conditions input by an operator of the machine is received from the mobile terminal, when the machining result information presentation request is received, the machining result information that satisfies the cutting conditions is extracted from the database and is presented to the mobile terminal on the basis of the use frequency of the machining result information, and a machining program is created on the basis of the machining result information selected by the operator among pieces of machining result information from the mobile terminal and is presented to the machine.

(10) A system (for example, a system 1, 1A to be described later) according to the present invention includes: the server (for example, a server 10, 10A to be described later) according to any one of (1) to (9); and one or more machines (for example, machines 30 to be described later) connected to the server via the network (for example, a network 20 to be described later).

According to the present invention, it is possible to provide a server and a system capable of allowing a beginner operator to easily obtain machining conditions that bring about a satisfactory machining result as compared to the conventional technique.

BRIEF DESCRIPTION OF THE DRAWINGS

FIG. 4 is a diagram illustrating a screen transition according to an embodiment of the present invention.

FIG. 5 is a diagram illustrating a screen transition according to an embodiment of the present invention.

FIG. 6 is a diagram illustrating a screen transition according to an embodiment of the present invention.

FIG. 7 is a diagram illustrating a screen transition according to an embodiment of the present invention.

FIG. 8 is a diagram illustrating a screen transition according to an embodiment of the present invention.

FIG. 9 is a diagram illustrating a screen transition according to an embodiment of the present invention.

FIG. 10 is a diagram illustrating a screen transition according to an embodiment of the present invention.

FIG. 11 is a diagram illustrating a screen transition according to an embodiment of the present invention.

FIG. 12 is a diagram illustrating a screen transition according to an embodiment of the present invention.

FIG. 13 is a diagram illustrating a screen transition according to an embodiment of the present invention.

FIG. 14 is a diagram illustrating a screen transition according to an embodiment of the present invention.

DETAILED DESCRIPTION OF THE INVENTION

Hereinafter, an embodiment of the present invention will be described with reference to FIGS. 1 to 15.

1. Configuration of Invention

Figure 1:
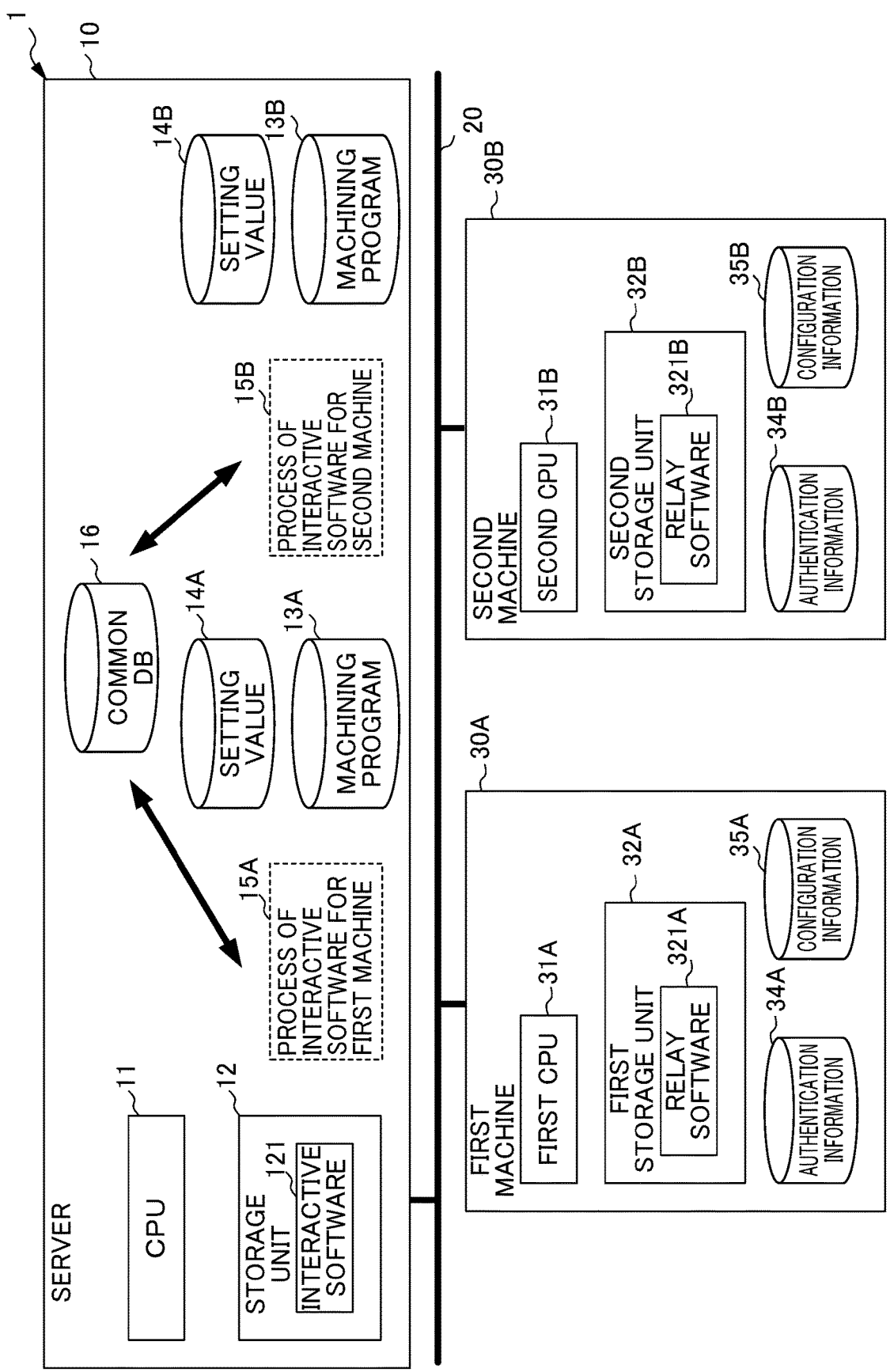
FIG. 1 is a diagram illustrating an overall configuration of a system according to an embodiment of the present invention.

FIG. 1 illustrates an overall configuration of a system 1. The system 1 includes a server 10, a network 20, and one or more machines 30 connected to the server 10 via the network 20. The number of machines 30 is not particularly limited. Although FIG. 1 illustrates an example in which two machines including a first machine 30A and a second machine 30B are present as the machine 30, the present invention is not limited thereto.

The server 10 includes a CPU 11 and a server-side storage unit 12 that stores interactive programming software (hereinafter referred to simply as "interactive software") 121.

Figure 2:
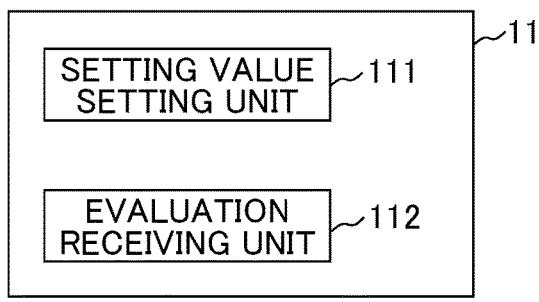
FIG. 2 is a functional block diagram of a control unit included in a server according to an embodiment of the present invention.

The CPU 11 is a processor that controls the entire server 10. The CPU 11 reads a system program stored in a ROM and the interactive software 121 via a bus and controls the entire server 10 according to the system program and the interactive software 121 so that the CPU 11 realizes the functions of a setting value setting unit 111 and an evaluation receiving unit 112 illustrated in the functional block diagram of FIG. 2. Although FIG. 2 illustrates a functional block diagram, the functional block of the server 10 is not limited thereto. For example, the server 10 may include individual functional blocks for each of the functions of the setting value setting unit 111 or the evaluation receiving unit 112. The server 10 may include one functional block including both the setting value setting unit 111 and the evaluation receiving unit 112. The functions of the respective functional blocks will be described later by referring to the screen transition diagrams of FIGS. 4 to 14.

The server 10 includes a first process storage unit 15A that stores processes of the interactive software 121 for the first machine, a first setting value storage unit 14A that stores setting values, and a first machining program storage unit 13A that stores a created machining program in correspondence to the first machine 30A. Similarly, the server 10 includes a second process storage unit 15B that stores processes the interactive software 121 for the second machine, a second setting value storage unit 14B that stores setting values, and a second machining program storage unit 13B that stores a created machining program in correspondence to the second machine 30B. The processes of the interactive software 121 operate on the CPU 11 of the server and the first and second process storage units 15A and 15B which are memories.

A common database 16 is a database shared by one or more machines 30 and mainly stores machining result information used for past cutting machining performed by one or more machines 30.

Figure 3:
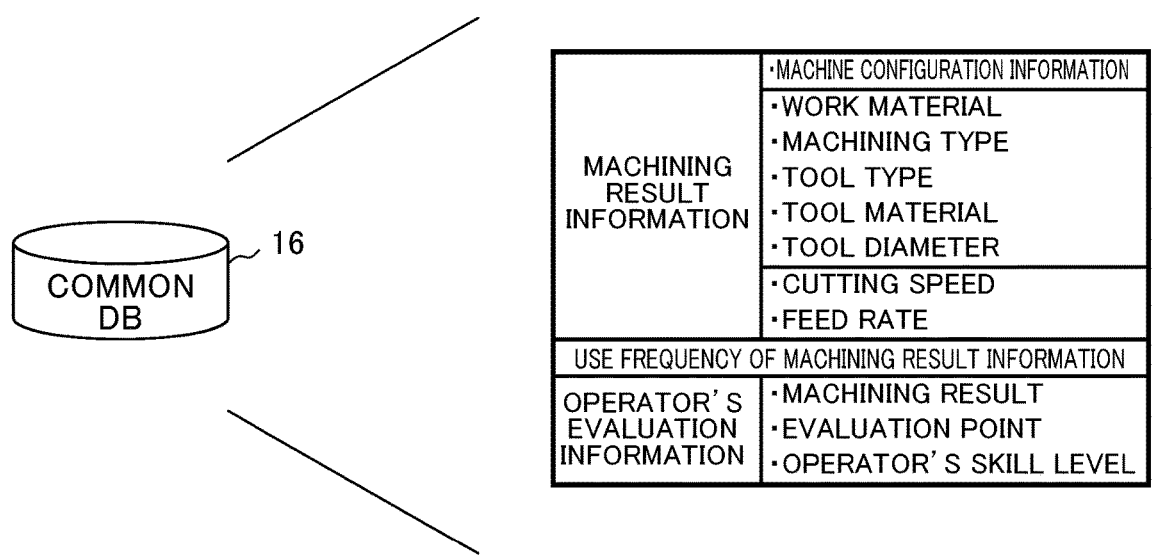
FIG. 3 is a diagram illustrating information stored in a common database included in the server according to the embodiment of the present invention.

FIG. 3 illustrates an example of information stored in the common database 16. The common database 16 includes at least information on setting values related to cutting machining for each cutting machining step as the machining result information and stores the use frequency of the setting value related to the cutting machining in correlation with the machining result information. The common database 16 stores at least one of pieces of operator's evaluation information on the results of the cutting machining performed using the setting values related to the cutting machining in correlation with the machining result information. The common database 16 stores these pieces of information for each step of the cutting machining process.

The information on the setting values related to cutting machining includes configuration information of each machine 30, a material of a machining target work, the type of machining, the type of a tool used for machining, the material of a tool, a tool diameter, and a cutting speed and a feed rate in cutting machining. Hereinafter, the configuration information of each machine 30, the material of a machining target work, the type of machining, the type of a tool used for machining, the material of a tool, and a tool diameter will be also referred to as cutting conditions. As will be described later, the cutting conditions are extraction conditions for extracting machining result information from the common database 16. As will be described later, these setting values may be stored in the common database 16 on the basis of setting value information stored in each setting value storage unit when the setting values are stored in each setting value storage unit of each machine, for example, for respective machining steps during generation of a machining program.

The use frequency of the setting values related to the cutting machining is the number of machining programs created on the basis of the setting values related to the cutting machining. Specifically, the server 10 records the use frequency by adding "1" to the use frequency when a machining program is generated using the machining result information including the setting value. The details thereof will be described later.

The operator's evaluation information includes information on an operator's skill level, an evaluation viewpoint, and an evaluation grade (hereinafter referred to as a "machining result") on a machining result based on the evaluation viewpoint. Here, the information on the operator's skill level means information indicating whether the operator is a veteran, a mid-grade operator, or a beginner at the machining, for example. The evaluation viewpoint means a viewpoint (a point) from which an operator evaluates a machining result, for example. More specifically, when an operator evaluates a machining result, the operator may evaluate the machining result from a viewpoint of a machining time (such an evaluation viewpoint will be referred to as a "machining time"), a viewpoint of machining accuracy (such an evaluation viewpoint will be referred to as "accuracy"), a viewpoint of the quality of a machined surface (such an evaluation viewpoint will be referred to as "quality"), a viewpoint of a life span of a machining tool (such an evaluation viewpoint will be referred to as a "tool life-span"), and a viewpoint of the price of a machining tool (such an evaluation viewpoint will be referred to as a "tool price"), for example. The machining result means an evaluation grade that an operator evaluates the machining result on the basis of the above-described evaluation viewpoint. Specifically, evaluation grades of excellent, good, fair, and fail may be used. For example, a machining result may be evaluated as an evaluation grade such that it is excellent from the viewpoint of machining time, good from the viewpoint of machining accuracy, fair from the viewpoint of machining quality, good from the viewpoint of tool life-span, and excellent from the viewpoint of tool price. Specifically, as will be described later, the evaluation information (that is, information on an operator's skill level, an emphasizing point (an evaluation viewpoint) related to machining, and a machining result) on the machining result by a machining program based on the setting values related to cutting machining is input for each step included in the cutting machining process. By doing so, machining result information (including setting value information related to cutting machining used by a machining program), a use frequency, and evaluation information (information on an operator's skill level, an emphasizing point related to machining, and a machining result) are accumulated in the common database 16. The details thereof will be described later. The operator's skill level, the evaluation viewpoint, and the machining result described above are examples only and are not limited thereto. For example, the operator's skill level may be numerical information such as the years of experience. Moreover, viewpoints other than the above-exemplified evaluation viewpoints may be added, and a score for a maximum score of 100, for example, may be assigned to the exemplified evaluation grade.

The machining result information and the evaluation information accumulated in the common database 16 are used when the server 10 presents machining result information to the machine 30 during execution of the interactive software 121. More specifically, when an operator sets the setting values (for example, a cutting speed, a feed rate, and the like of each axis) related to cutting machining for each step included in a cutting machining process during creation of a machining program, the operator can set the setting values by referring to machining result information obtained by executing the same or similar cutting machining as the present cutting conditions. Specifically, the server 10 can provide machining result information obtained by executing the same or similar cutting machining as the present cutting conditions by searching the common database 16 on the basis of the present cutting conditions according to a request from the operator. The details thereof will be described later.

The first machine 30A includes a first CPU 31A which is a first machine-side processor, a first machine-side storage unit 32A that stores relay software 321A, a first authentication information storage unit 34A that stores authentication information of the first machine 30A, and a first configuration information storage unit 35A that stores configuration information of the first machine. Similarly, the second machine 30B includes a second CPU 31B which is a second machine-side processor, a second machine-side storage unit 32B that stores relay software 321B, a second authentication information storage unit 34B that stores authentication information of the second machine, and a second configuration information storage unit 35B that stores configuration information of the second machine.

The first CPU 31A which is a processor of the first machine 30A executes the relay software 321A which is software that relays display data and operation data to the interactive software 121 on the server 10. Similarly, the second CPU 31B which is the second machine-side processor executes the relay software 321B which is software that relays display data and operation data to the interactive software 121 on the server 10. Here, the display data is output data to the first machine 30A (or the second machine 30B) of the interactive software 121, and specifically, is data for displaying an input screen for inputting cutting condition data related to the cutting machining to be described later on the first machine 30A (or the second machine 30B), for example. The operation data is input data to the interactive software 121 input from the first machine 30A (or the second machine 30B) via keys, a touch panel, or a mouse, and specifically, is cutting condition data related to cutting machining input via an input screen.

Examples of the authentication information stored in the authentication information storage units 34A and 34B include a numerical controller (CNC) ID, a machine (MAC) ID, and the like. Examples of the configuration information stored in the first and second configuration information storage units 35A and 35B include the number of axes of the first and second machines 30A and 30B, axis name, option functions, parameters, and the like.

2. Operation of System

Hereinafter, an operation of the system 1 according to the present invention (particularly, an operation of generating a machining program for allowing the first machine 30A to perform cutting machining) will be described in detail. Although FIGS. 4 to 14 illustrate an example of major screens when the first machine 30A (or the second machine 30B) generates a machining program, a dialog screen of the present invention is not limited thereto. For example, input and output data displayed on a plurality of screens may be displayed on one screen. Conversely, input/output data displayed on one screen may be distributed to a plurality of screens.

[2.1 Preliminary Process]

First, as a preliminary process of execution of the interactive software 121, the server 10 reads the interactive software 121 into the server-side storage unit 12, and the first machine 30A reads the relay software 321A into the first machine-side storage unit 32A. Moreover, the relay software 321A transmits the authentication information stored in the first authentication information storage unit 34A of the first machine 30A to the server 10 to activate the interactive software 121.

[2.2 Creation of Machining Program]

The server 10 (the interactive software 121) receives the configuration information of the first machine 30A that performs cutting machining, input by a user from the first machine 30A (the relay software 321A) (or input from the first configuration information storage unit 35A by the relay software 321A) as the setting value of the machining program.

The server 10 (the interactive software 121) receives information on the material of a work input by a user from the first machine 30A (the relay software 321A) as the setting value of the machining program. Here, the work material is AL, S45C, SC, FC, or SUS, for example.

The server 10 (the interactive software 121) receives part shape information which is the shape of a part to be machined, input by a user from the first machine 30A (the relay software 321A) as the setting value of the machining program. Here, the part shape information may be figure data created in advance by a CAD and may be a cutter location data (CL data) created by a CAM, for example.

The flow until the interactive software 121 receives the part shape information after the configuration information of the first machine 30A is received is well-known to those skilled in the art, and the detailed description thereof will be omitted.

Upon the server 10 (the interactive software 121) receiving the part shape information, the server 10 (the setting value setting unit 111) causes the first machine 30A (the relay software 321A) to display a setting step list screen 51. The setting step list screen 51 is a screen for setting machining steps, and information on a machining type, a machining shape, a tool type, a tool material, and a tool diameter is mainly set for each machining step. FIG. 4 illustrates an example of the setting step list screen 51. Here, the machining type indicates hole machining (drilling, tapping, reaming, back boring, chamfering, and the like), turning (roughing, finishing, slot roughing, slot finishing, threading, and the like), and milling (contouring, pocketing, grooving, surfacing, and the like), for example. The tool type indicates a center drill, a drill, a tap, a reamer, a general-purpose byte, a threading byte, a round byte, an end mill, a face mill, and the like, for example. The tool material indicates a high-speed tool steel (HSS), cemented carbide, a cermet, ceramics, polycrystalline CBN, and the like, for example.

The server 10 (the setting value setting unit 111) receives information on the machining type, the tool type, the tool material, and the tool diameter for each machining step, input by the user via the setting step list screen 51 from the first machine 30A (the relay software 321A) as the setting value of the machining program.

The server 10 (the setting value setting unit 111) can display a step details setting screen 52 for setting the details of a step selected by the user via the setting step list screen 51 from the first machine 30A (the relay software 321A). That is, the server 10 (the setting value setting unit 111) causes the first machine 30A (the relay software 321A) to display the step details setting screen 52 on the basis of the step selected by the user. Here, the step details setting screen 52 is a screen for setting a cutting direction in the step and the setting value (also referred to as "step details information") related to cutting, for example. FIG. 5 illustrates an example of the step details setting screen 52.

The server 10 (the setting value setting unit 111) receives the step details information of the step, input by the user via the step details setting screen 52 from the first machine 30A (the relay software 321A) as the setting value of the machining program.

When all pieces of step details information are input by the user via the step details setting screen 52 from the first machine 30A (the relay software 321A), the server 10 (the setting value setting unit 111) can cause the first machine 30A (the relay software 321A) to display a tool information setting screen 53 for setting the details of the tool information in the step. Here, the tool information setting screen 53 is a screen for setting the tool information (for example, information on a tool type, a tool material, a tool dimension (including a tool diameter), a machining purpose, and an attachment position). FIG. 6 illustrates an example of the tool information setting screen 53.

The server 10 (the setting value setting unit 111) receives the tool information of the step, input by the user via the tool information setting screen 53 from the first machine 30A (the relay software 321A) as the setting value of the machining program.

When all pieces of tool information of the step are input by the user via the tool information setting screen 53 from the first machine 30A (the relay software 321A), the server 10 (the setting value setting unit 111) can cause the first machine 30A (the relay software 321A) to display the cutting speed setting screen 54 for setting the cutting speed. The cutting speed setting screen 54 is a screen for setting a cutting speed and a feed rate in the step, for example, and is also a screen that provide a "hint" button which is one of the features of the present invention. Here, the feed rate may include a feed rate in a cutting direction, a feed rate in a depth-of-cut direction, and a feed rate in a cut-up direction. The cutting speed may include a spindle maximum speed. FIG. 7 illustrates an example of the cutting speed setting screen 54.

The server 10 (the setting value setting unit 111) receives information on the cutting speed and the feed rate input by the user via the cutting speed setting screen 54 from the first machine 30A (the relay software 321A) as the setting value of the machining program. However, when the user cannot input appropriate setting values as the information on the cutting speed and the feed rate, and when a "hint" button is pressed by the user via the cutting speed setting screen 54 from the first machine 30A (the relay software 321A), and the server 10 (the setting value setting unit 111) receives a request to display a hint screen 55, the server 10 (the setting value setting unit 111) can cause the first machine 30A (the relay software 321A) to display the hint screen 55. The server 10 (the setting value setting unit 111) may cause the first machine 30A (the relay software 321A) to display the hint screen 55 when the information on the cutting speed and the feed rate is not received even if a predetermined time has elapsed after the cutting speed setting screen 54 was displayed on (transmitted to) the first machine 30A (the relay software 321A). By doing so, it is possible to create the machining program in an efficient and user-friendly manner. The hint screen 55 is a screen for inputting cutting conditions for requesting the server 10 (the setting value setting unit 111) to retrieve machining result information corresponding to a setting value that a veteran operator has judged to be generally "satisfactory", a setting value that is frequently used in a field, and a point emphasized by the cutting machining (for example, machining quality and a tool life-span are emphasized), for example, as the setting value related to the cutting speed and the feed rate of the cutting machining. FIG. 8 illustrates an example of the hint screen.

A user can request the server 10 (the setting value setting unit 111) to extract machining result information having the same or similar cutting conditions as the cutting conditions of the present machining program from the common database 16 and provide the extracted machining result information via the hint screen 55. Specifically, the user can designate an emphasizing point in creating the present machining program via the hint screen 55. Here, examples of the emphasizing point include a machining time, accuracy, quality, a tool life-span, and a tool price related to machining, for example. These points correspond to the evaluation viewpoints in the operator's evaluation information correlated with the machining result information recorded in the common database 16. Which point will be emphasized in creation of the present machining program may be designated on the basis of whether each point will be emphasized or not (on or off), for example. The degree of importance (for example, most important, important, normal, not important, or the like) may be designated for each point. Although FIG. 8 illustrates the former case, the present invention is not limited thereto. By doing so, the server 10 (the setting value setting unit 111) can receive additional conditions on which will be emphasized in the step, input by the user via the hint screen 55 from the first machine 30A (the relay software 321A).

When a point emphasized in the step is input by the user via the hint screen 55 from the first machine 30A (the relay software 321A), the server 10 (the setting value setting unit 111) extracts machining result information having the same cutting condition as the cutting condition of the present machining program from the common database 16. More specifically, the server 10 (the setting value setting unit 111) retrieves and extracts machining result information of which the cutting conditions received in advance (the configuration information of a machine, a work material, a machining type, a tool type, a tool material, and a tool diameter) are the same as the setting values of the machining program. When the machining result information having the same cutting conditions is not present, the machining result information having the same cutting conditions excluding the machine configuration information (that is, a work material, a machining type, a tool type, a tool material, and a tool diameter) may be retrieved and extracted as alternatives, for example.

When a plurality of pieces of extracted machining result information are present, the server 10 (the setting value setting unit 111) may calculate the priority order of providing the machining result information to the user on the basis of the use frequency and/or the evaluation information. Specifically, the server 10 (the setting value setting unit 111) may calculate the priority level of each piece of machining result information on the basis of the use frequency of the machining result information and the additional conditions on which point will be emphasized in the step, input by the user and may provide the machining result information having the high priority level preferentially. Here, the priority level may be calculated, for example, by adding a value obtained by multiplying the evaluation grade of the machining result information at an evaluation viewpoint corresponding to a point emphasized by the additional condition by a weighting factor, a value obtained by multiplying the evaluation grade of the machining result information at an evaluation viewpoint corresponding to a point that is not emphasized by zero, and a score value corresponding to the use frequency. A priority level calculation method is not limited thereto. The priority level may be calculated so that the machining result information having a higher evaluation grade at an evaluation viewpoint corresponding to a point being emphasized has a higher priority level.

The server 10 (the setting value setting unit 111) causes the first machine 30A (the relay software 321A) to display a retrieval result screen 56 for providing the machining result information on the basis of the priority level calculated in this manner. The retrieval result screen 56 displays the cutting speed and the feed rate in the machining result information having the same (or similar) cutting conditions as the cutting conditions of the present machining program on the basis of the priority level. One or a plurality of pieces of machining result information may be displayed on the retrieval result screen 56. FIG. 9 illustrates an example of the retrieval result screen 56.

The server 10 (the setting value setting unit 111) receives the information on the cutting speed and the feed rate in the step as the setting value of the machining program on the basis of the machining result information selected by the user via the retrieval result screen 56 from the first machine 30A (the relay software 321A). The server 10 (the setting value setting unit 111) can cause the first machine 30A (the relay software 321A) to display the cutting speed setting screen 54 in which the information on the cutting speed and the feed rate is set.

The server 10 (the setting value setting unit 111) can set all setting values of the machining step in the above-described manner. After that, the server 10 (the interactive software 121) generates a machining program on the basis of the setting values of the machining step. A procedure of generating the machining program after the setting values are set is well-known to those skilled in the art, and the detailed description thereof will be omitted.

The server 10 (the interactive software 121) causes the first machine 30A to perform cutting machining using the generated machining program. In the cutting machining, "1" may be added to the use frequency of the selected machining result information recorded in the common database 16. When selected machining result information is not present and new setting value information is set, the server 10 (the interactive software 121) generates new machining result information on the basis of the new setting value information, adds the generated machining result information to the common database 16, and sets an initial value to the information on the use frequency in the machining result information.

[2.3 Evaluation of Machining Result]

After the machining program generated by the server 10 (the interactive software 121) is executed to cause the first machine 30A to perform cutting machining, the server 10 (the evaluation receiving unit 112) updates the machining result information selected during generation of the machining program recorded in the common database 16 by adding operator's evaluation information on the machining result obtained by the present machining program. Next, a process of updating the machining result information selected during generation of the machining program by adding operator's evaluation information on the machining result obtained by the present machining program will be described.

The server 10 (the evaluation receiving unit 112) causes the first machine 30A (the relay software 321A) to display a completed step list screen 58 in response to an evaluation request by an operator. The completed step list screen 58 mainly includes information on a machining type, a machining shape, a tool type, a tool material, and a tool diameter. FIG. 11 illustrates an example of the completed step list screen 58.

The server 10 (the error information 112) causes the first machine 30A (the relay software 321A) to display an evaluation screen 59 for setting the evaluation information on the machining result obtained by the machining program of the step selected by the user via the completed step list screen 58. The evaluation screen 59 includes information on the cutting speed and the feed rate as evaluation target setting value information. FIG. 12 illustrates an example of the evaluation screen 59.

The server 10 (the evaluation receiving unit 112) can cause the first machine 30A (the relay software 321A) to display an evaluation input screen 60 after the operator confirms information on the cutting speed and the feed rate. The evaluation input screen 60 is a screen for displaying the information on the tool and the cutting speed and inputting the operator's evaluation information (information on an operator's skill level, an evaluation viewpoint, and an evaluation grade (machining result) on the machining result based on the evaluation viewpoint) as evaluation reference information. The server 10 (the evaluation receiving unit 112) may display a "beginner" button, a "mid-grade operator" button, and a "veteran" button indicating the skill level of an operator in advance on the evaluation input screen 60 and cause a user to press any one of the buttons to receive the skill level of the operator from the first machine 30A (the relay software 321A). Similarly, the server 10 (the evaluation receiving unit 112) may display a "not evaluate" button corresponding to whether "evaluation viewpoint" (for example, "machining time", "machining accuracy", "machining quality", "tool life-span", and "tool price") is emphasized or not in advance on the evaluation input screen 60, display an evaluation grade button (for example, "excellent", "good", "fair", and "fail") corresponding to the evaluation viewpoint, and cause the user to press any one of the buttons to receive an evaluation viewpoint and an evaluation grade (machining result) on the machining result based on the evaluation viewpoint from the first machine 30A (the relay software 321A). By doing so, the user can input the evaluation information easily. FIG. 13 illustrates an example of the evaluation input screen 60.

The server 10 (the evaluation receiving unit 112) receives the evaluation information input by the user via the evaluation input screen 60 from the first machine 30A (the relay software 321A). Upon receiving the evaluation information input by the user, the server 10 (the evaluation receiving unit 112) can cause the first machine 30A (the relay software 321A) to display an evaluation confirmation screen 61. The evaluation confirmation screen 61 is a screen displayed to confirm the evaluation information input by the user. The server 10 (the evaluation receiving unit 112) can receive whether adding and updating of evaluation information will be approved (OK), canceled, or changed via the evaluation confirmation screen 61 from the first machine 30A (the relay software 321A). FIG. 14 illustrates an example of the evaluation confirmation screen 61.

When the evaluation is confirmed by the operator, the server 10 (the evaluation receiving unit 112) adds the evaluation information to the common database 16 in correlation with evaluation target machining result information to update the common database 16. In this way, the user can easily generate the machining program for performing cutting machining in the first machine 30A by the processing of the server 10 (the interactive software 121) and easily input evaluation information on the machining result obtained by the generated machining program.

Figure 15:
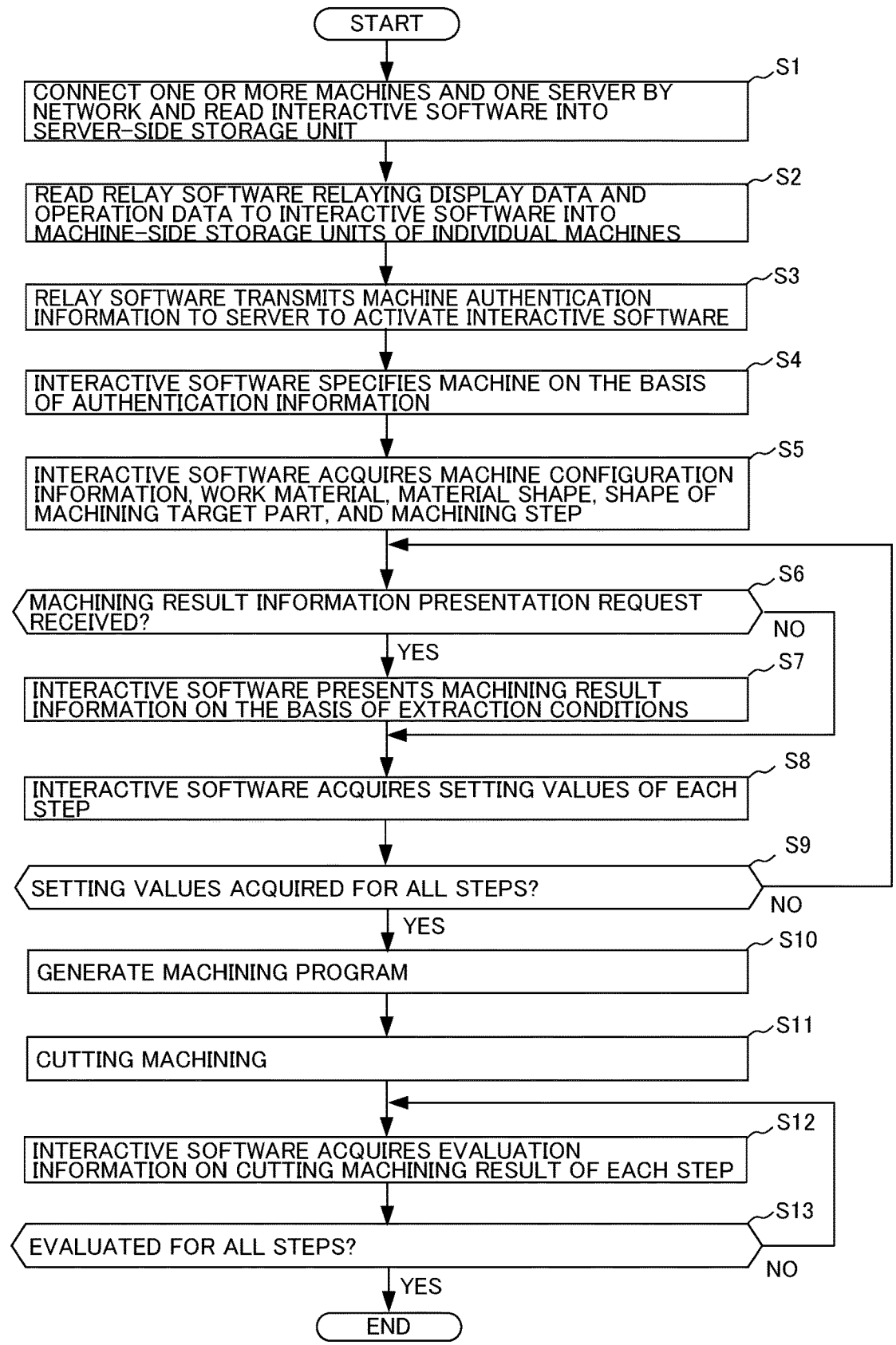
FIG. 15 is a flowchart illustrating a process flow of the system according to the embodiment of the present invention.

Next, the process flow of the system 1 will be described. FIG. 15 illustrates a flowchart related to the processing of the system 1. Referring to FIG. 15, first, in step S1, one or more machines 30 and one server 10 are connected by the network 20, and the interactive software 121 is read into the server-side storage unit 12.

In step S2, the relay software 321A that relays display data and operation data to the interactive software 121 is read into the first machine-side storage unit 32A of the first machine 30A.

In step S3, the first machine 30A (the relay software 321A) transmits the authentication information stored in the first authentication information storage unit 34A of the first machine 30A to the server 10 to activate the interactive software 121.

In step S4, the server 10 (the interactive software 121) specifies the first machine 30A on the basis of the authentication information.

In step S5, the server 10 (the interactive software 121) acquires information on the configuration information of the first machine 30A, a work material, a material shape, the shape of a machining target part, and a machining step.

In step S6, when the server 10 (the interactive software 121) has received the machining result information presentation request (S6: YES), the flow proceeds to step S7. When the machining result information presentation request is not received (S6: NO), the flow proceeds to step S8.

In step S7, the interactive software 121 extracts the machining result information from the common database 16 on the basis of the cutting conditions and presents the machining result information to the first machine 30A. An operator selects any one of the presented pieces of machining result information.

In step S8, the server 10 (the interactive software 121) acquires the setting values of each step.

In step S9, when the server 10 (the interactive software 121) has acquired the setting values of all steps (S9: YES), the flow proceeds to step S10. When the server 10 (the interactive software 121) has not acquired the setting values of all steps (S9: NO), the flow proceeds to step S6.

In step S10, the server 10 (the interactive software 121) generates a machining program using the acquired setting values. Moreover, the server 10 (the interactive software 121) transmits the generated machining program to the first machine 30A.

In step S11, the first machine 30A executes cutting machining using the received machining program.

In step S12, the server 10 (the interactive software 121) acquires evaluation information on the cutting machining results of each step.

In step S13, when the server 10 (the interactive software 121) has acquired the evaluation information on the cutting machining results of all steps (S13: YES), the process ends. When the server 10 (the interactive software 121) has not acquired the evaluation information on the cutting machining results of all steps (S13: NO), the flow proceeds to step S12.

4. Advantages of Embodiment

In the above-described embodiment, the server 10 can extract candidates for machining information from the common database 16 shared by respective machines 30 rather than from the first setting value storage unit 14A dedicated for the first machine 30A and present the extracted machining information to the machine 30. In this way, a beginner operator can easily obtain information on the machining conditions that bring about a satisfactory machining result as compared to the conventional technique. Particularly, even when the setting values satisfying desired machining conditions are not found in the setting value storage unit 14 corresponding to the machine 30, optimal machining result information among pieces of machining result information of other machines 30 accumulated in the common database 16 can be presented as a hint for cutting machining. Therefore, it is possible to reduce the time and effort of an operator to search for appropriate setting value information related to the machining.

In the above-described embodiment, the server 10 can receive operator's evaluation information on the cutting machining result and present optimal machining result information to the machine 30 on the basis of the evaluation information. In this way, since a hint for machining information can be presented on the basis of the operator's evaluation on the cutting machining result, it is possible to easily use setting values that are judged to be generally satisfactory as well as the setting values having a high use frequency.

5. Modification

[5.1 Modification 1]

Figure 16:
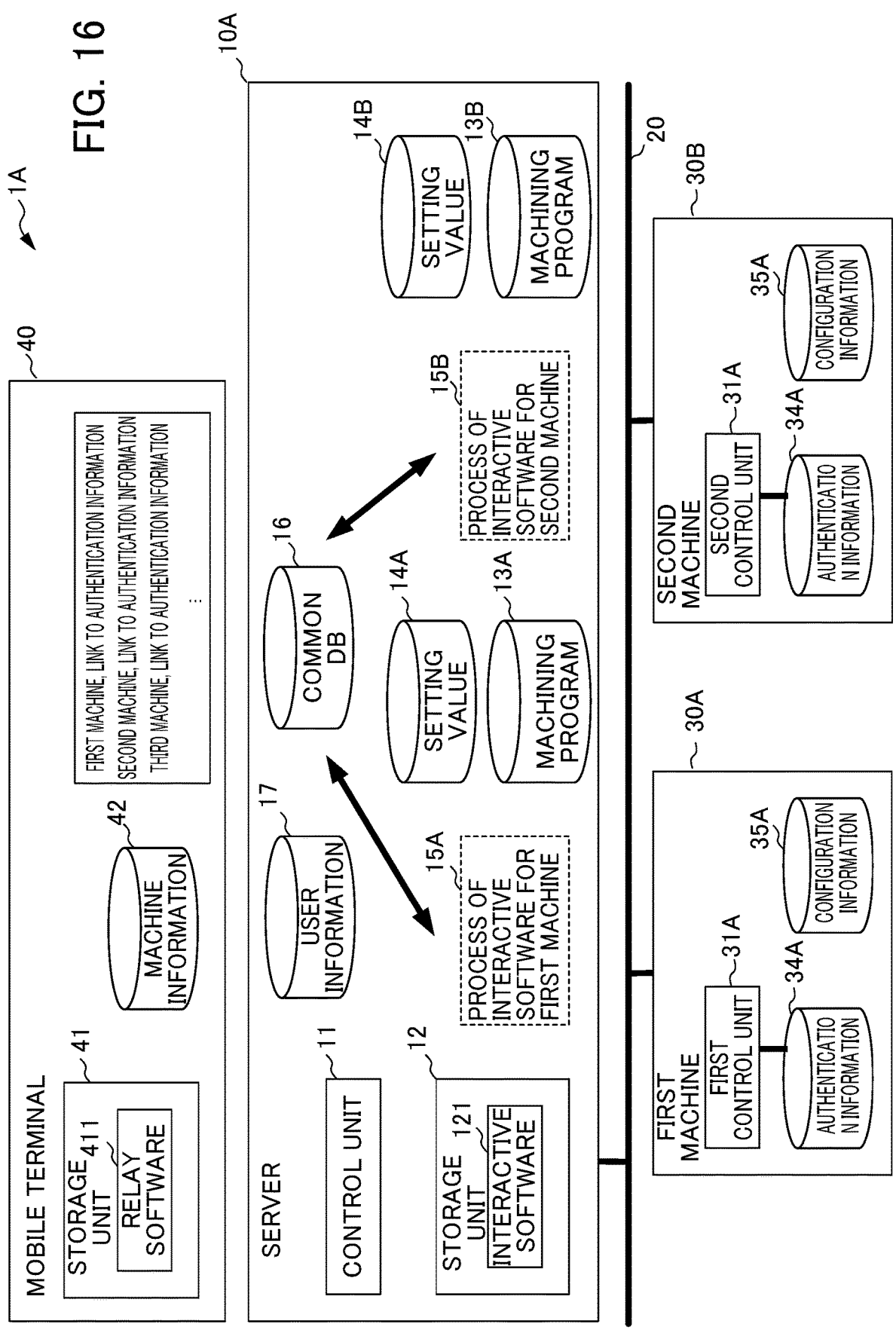
FIG. 16 is a diagram illustrating an overall configuration of a system according to a modification of the present invention.

FIG. 16 is a diagram illustrating an overall configuration of a system 1A according to a modification of the present invention. The system 1A of this modification is different from the system 1 of the above-described embodiment in that a relay software 411 is stored in a storage unit 41 of a mobile terminal 40 which is a communication device and the mobile terminal 40 communicates with the server 10A to create machining programs of a plurality of machines. The other configuration of the system 1A of the modification is the same as the configuration of the system 1 according to the above-described embodiment, and the detailed description thereof will be omitted.

In the system 1A according to the modification of the present invention, the mobile terminal 40 accesses the server 10A and inputs a user name and a password to log into the server 10A. The server 10A allows the access from the mobile terminal 40 by comparing the user name and the password with the user information stored in a user information storage unit 17.

The mobile terminal 40 includes a machine information storage unit 42 that stores machine information. The machine information includes information on the first machine 30A, information on a link to the authentication information of the first machine 30A, and the like. The mobile terminal 40 selects a motor 30 that creates a machining program. A case in which the first machine 30A is selected will be described as an example.

The mobile terminal 40 acquires the authentication information of the first machine 30A on the basis of the machine information. Subsequently, the relay software 411 of the mobile terminal 40 transmits the authentication information of the first machine 30A to the server 10A to activate the interactive software 121 to execute the process of the interactive software 121 of the first machine 30A. The configuration information of the first machine 30A is acquired according to the process of the interactive software 121. The acquired configuration information is stored on the server 10A.

The interactive software 121 sets the setting values of the interactive software 121 automatically on the basis of the acquired configuration information. The display data of the interactive software 121 is displayed on the mobile terminal 40, a necessary operation is performed by the mobile terminal 40, and the display data is transmitted to the server 10A.

In this way, the server 10A creates a machining program according to the process of the interactive software 121 and transmits the created machining program to the first machine 30A. The first machine 30A performs machining of a machining target object according to the received machining program.

According to the system 1A of the modification of the present invention, since the machining program can be created using the mobile terminal 40, it is possible to perform an operation at a place distant from the machine 30.

[5.2 Modification 2]

In the above-described embodiment, when an operator inputs a machining result information presentation request via the hint screen 55 and the machining result information presentation request is transmitted to the setting value setting unit 111 together with the cutting conditions, the setting value setting unit 111 extracts machining result information that satisfies the cutting conditions. However, the present invention is not limited thereto. For example, when an operator has not input anything on the cutting speed setting screen 54 for a certain period, the setting value setting unit 111 may extract machining result information that satisfies the cutting conditions.

[5.3 Modification 3]

In the above-described embodiment, the interactive software 121 may be a WEB application in the server 10 or the server 10A, and the relay software 321 and the relay software 411 of Modification 1 may be a browser.

While the embodiments of the present invention have been described, the present invention is not limited to the above-described embodiments. The effects described in the present embodiment are only examples of most preferable effects produced by the present invention, and the effects of the present invention are not limited to those described in the present embodiment.

A control method by the server 10, 10A is realized by software. When the method is realized by software, programs that form the software are installed on a computer (the server 10, 10A). Moreover, these programs may be recorded on a removable medium and distributed to users and may be distributed by being downloaded to a user's computer via a network. Furthermore, these programs may be provided to a user's computer (the server 10, 10A) as a Web service via a network without being downloaded.

EXPLANATION OF REFERENCE NUMERALS 1, 1A: System
10, 10A: Server
11: CPU
12: Server-side storage unit
16: Common database
20: Network
30, 30A, 30B: Machine
31A: First CPU
31B: Second CPU
32A: First storage unit
32B: Second storage unit
121: Interactive programming software
321: Relay software

What is claimed is:

1. A server connected to one or more machines that perform cutting machining via a network, wherein
a database shared by the respective machines is stored in the server, the database including at least machining result information used in steps included in a cutting machining process performed by the machine and information on a number of times the machining result information has been used which is a number of machining programs created on the basis of the machining result information,
a machining result information presentation request requesting to present machining result information that satisfies cutting conditions input by an operator of the machine is received from the machine,
when the machining result information presentation request is received, the machining result information that satisfies the cutting conditions is extracted from the database and is presented to the machine on the basis of the number of times the machining result information has been used, and
a machining program is created on the basis of machining result information selected by the operator among pieces of machining result information from the machine and is presented to the machine.

2. The server according to claim 1, wherein
the machining result information includes configuration information of the machine, a work material, a type of cutting machining in a step included in the cutting machining process, a type of a tool used in the cutting machining, a material of the tool, a tool diameter of the tool, a cutting speed in the cutting machining, and a feed rate in the cutting machining.

3. The server according to claim 1, wherein
the cutting conditions include at least one of configuration information of the machine, a work material, a type of cutting machining in a step included in the cutting machining process, a type of a tool used in the cutting machining, a material of the tool, and a tool diameter of the tool.

4. The server according to claim 1, wherein
when a machining program is created on the basis of the selected machining result information, 1 is added to the number of times the machining result information has been used, or
when the machining result information is not selected and a machining program is created on the basis of newly set machining information, machining result information is generated on the basis of the machining information and an initial value is set to the information on the number of times the machining result information has been used.

5. The server according to claim 1, wherein
when the machining program is executed by the machine, evaluation information including a skill level of the operator, an emphasizing point emphasized by the operator, and an evaluation grade on a machining result of the machining program by the operator is stored in correlation with the machining result information included in the database.

6. The server according to claim 5, wherein
the emphasizing point included in the evaluation information includes
a machining time, machining accuracy, machining quality, a tool life-span, or a tool price.

7. The server according to claim 5, wherein
the machining result information presentation request further includes an emphasizing point related to machining, and when the machining result information that satisfies the cutting condition is extracted from the database, the machining result information is presented to the machine on the basis of the emphasizing point.

8. The server according to claim 1, wherein
when the cutting machining process includes a plurality of steps, the machining result information presentation request in the step is received and the machining result information is presented.

9. A server connected to a mobile terminal and one or more machines that perform cutting machining via a network, wherein
a database shared by the respective machines is stored in the server, the database including at least machining result information used in steps included in a cutting machining process performed by the machine and information on a number of times the machining result information has been used which is a number of machining programs created on the basis of the machining result information,
a machining result information presentation request requesting to present machining result information that satisfies cutting conditions input by an operator of the machine is received from the mobile terminal, when the machining result information presentation request is received, the machining result information that satisfies the cutting conditions is extracted from the database and is presented to the mobile terminal on the basis of the number of times the machining result information has been used, and a machining program is created on the basis of the machining result information selected by the operator among pieces of machining result information from the mobile terminal and is presented to the machine.

10. A system comprising:

the server according to claim 1; and one or more machines connected to the server via the network.

\* \* \* \* \*